United States Patent
Schulz

(10) Patent No.: US 7,484,430 B2
(45) Date of Patent: Feb. 3, 2009

(54) TELESCOPE FEATURE USED FOR ENERGY ABSORPTION

(75) Inventor: John F. Schulz, Hemlock, MI (US)

(73) Assignee: Delphi Technologies, Inc., Troy, MI (US)

( * ) Notice: Subject to any disclaimer, the term of this patent is extended or adjusted under 35 U.S.C. 154(b) by 834 days.

(21) Appl. No.: 10/899,811

(22) Filed: Jul. 27, 2004

(65) Prior Publication Data

US 2006/0021460 A1   Feb. 2, 2006

(51) Int. Cl.
*B62D 1/19* (2006.01)
(52) U.S. Cl. .......................................... 74/493; 280/777
(58) Field of Classification Search .................. 74/493; 280/777
See application file for complete search history.

(56) References Cited

U.S. PATENT DOCUMENTS

| 5,562,307 | A | 10/1996 | Connor |
| 5,820,163 | A * | 10/1998 | Thacker et al. .............. 280/775 |
| 6,170,874 | B1 | 1/2001 | Fosse |
| 6,189,929 | B1 | 2/2001 | Struble et al. |
| 6,322,103 | B1 | 11/2001 | Li et al. |
| 6,419,269 | B1 | 7/2002 | Manwaring et al. |
| 6,652,002 | B2 | 11/2003 | Li et al. |
| 6,811,185 | B2 * | 11/2004 | Bohlen et al. ............... 280/777 |
| 2002/0171235 | A1 | 11/2002 | Riefe et al. |

OTHER PUBLICATIONS

European Search Report dated Apr. 3, 2006.

* cited by examiner

*Primary Examiner*—William C Joyce
(74) *Attorney, Agent, or Firm*—Thomas N. Twomey

(57) ABSTRACT

The invention includes a steering column assembly positionable in a vehicle. The invention also includes a connecting device releaseably attachable to the vehicle. The connecting device is moveable between a locked configuration and an unlocked configuration to selectively lock the steering column assembly with respect to the vehicle. The invention also includes a first energy absorber disposed between the connecting device and the steering column assembly. The first energy absorber is selectively engageable to dissipate energy. For example, the first energy absorber is engaged to dissipate energy in response to relative movement between the connecting device and the steering column assembly when the connecting device is in the locked configuration. The first energy absorber is disengaged with respect to dissipating energy in response to relative movement between the connecting device and the steering column assembly when the connecting device is in the unlocked configuration.

30 Claims, 3 Drawing Sheets

TELESCOPE FEATURE USED FOR ENERGY ABSORPTION

FIELD OF THE INVENTION

The invention relates to an energy absorber associated with a steering system of a vehicle to reduce the likelihood of injury to a driver.

BACKGROUND OF THE INVENTION

Steering systems for vehicles often include a device to absorb energy associated with a driver impacting a steering column, as may occur during a vehicle crash. The energy absorbing device often includes a metal strap and an anvil. One end of the strap is fixed to a first structure in the steering column and the anvil is fixed to a second structure in the steering column. The first and second structures move relative to one another during an impact situation and the strap is drawn over the anvil to dissipate energy.

SUMMARY OF THE INVENTION AND ADVANTAGES

The invention includes a steering column assembly positionable in a vehicle. The invention also includes a connecting device releasably attachable to the vehicle. The connecting device is moveable between a locked configuration and an unlocked configuration to selectively lock the steering column assembly with respect to the vehicle. The invention also includes a first energy absorber disposed between the connecting device and the steering column assembly. The first energy absorber is selectively engageable to dissipate energy. For example, the first energy absorber is engaged to dissipate energy in response to relative movement between the connecting device and the steering column assembly when the connecting device is in the locked configuration. The first energy absorber is disengaged with respect to dissipating energy in response to relative movement between the connecting device and the steering column assembly when the connecting device is in the unlocked configuration.

The invention allows the steering column to be fixed to the vehicle during normal vehicle handling while also allowing energy to be dissipated in an impact situation. The invention can be used in combination with one or more other energy absorbing devices to enhance the dissipation of energy. For example, a second energy absorber can be disposed between the steering column and the vehicle to dissipate energy in response to relative movement between the steering column and the vehicle. Also, a third energy absorber can be disposed between the connecting device and the vehicle to dissipate energy in response to relative movement between the connecting device and the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
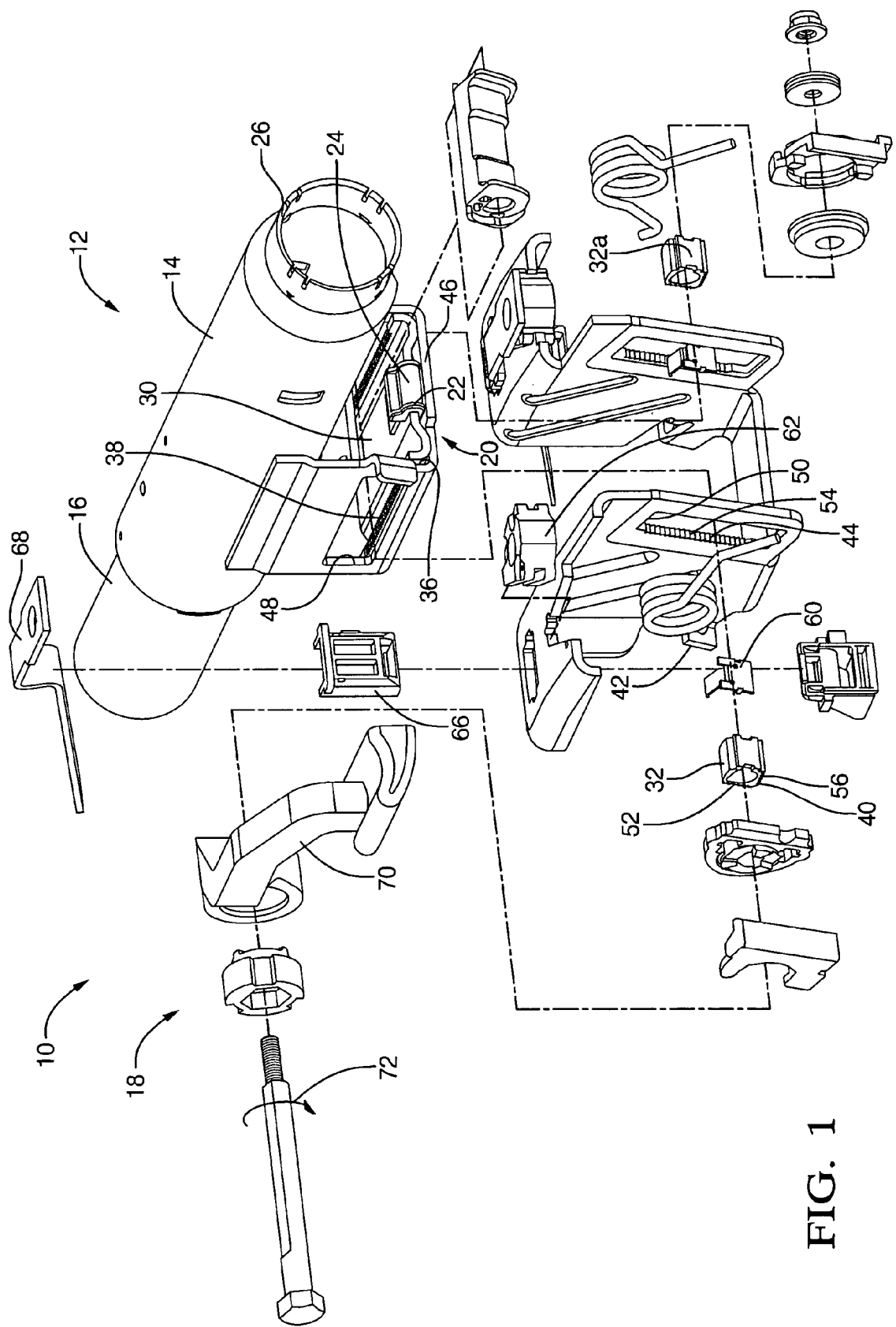
FIG. 1 is an exploded view of a first exemplary embodiment of the invention.

A plurality of different embodiments of the invention are shown in the Figures of the application. Similar features are shown in the various embodiments of the invention. Similar features have been numbered with a common two-digit reference numeral and have been differentiated by a third digit placed before the two common digits. Similar features are structured similarly, operate similarly, and/or have the same function unless otherwise indicated.

Figure 2:
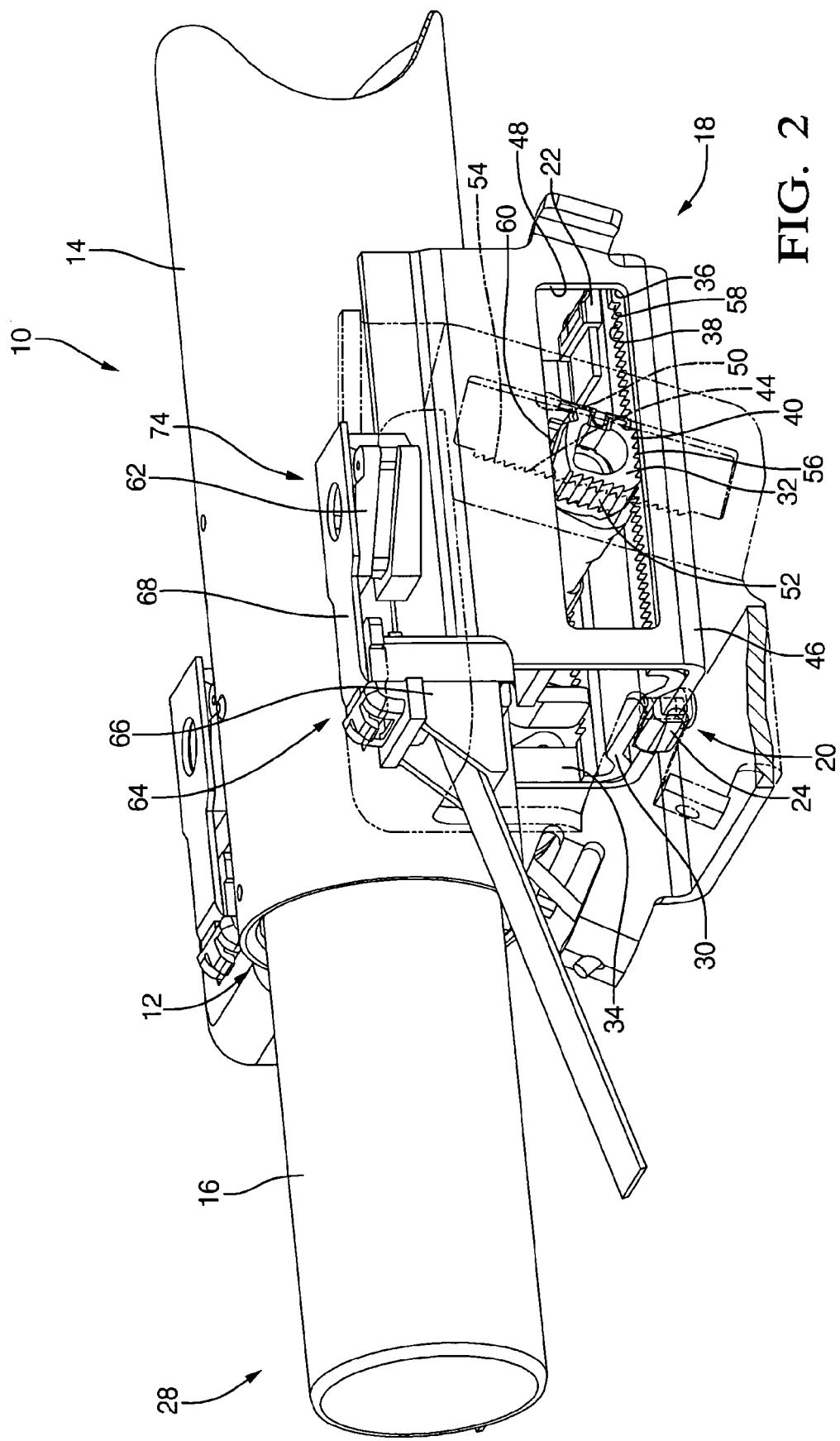
FIG. 2 is a perspective view of the first exemplary embodiment showing a partial cut-away of a third locking member.

Referring now to FIGS. 1 and 2, in a first exemplary embodiment of the invention, an apparatus includes a steering column assembly 12 that is positionable in a vehicle. The apparatus also includes a connecting device 18 that is releasably attachable to the vehicle. The connecting device 18 is movable between a locked configuration and an unlocked configuration to selectively lock the steering column assembly 12 with respect to the vehicle. The apparatus also includes a first energy absorber 20 disposed between the connecting device 18 and the steering column assembly 12. The first energy absorber 20 is engaged to dissipate energy in response to relative movement between the connecting device 18 and the steering column assembly 12 when the connecting device 18 is in the locked configuration. The first energy absorber 20 is disengaged with respect to dissipating energy in response to relative movement between the connecting device 18 and the steering column 12 when the connecting device 18 is in the unlocked configuration.

The steering column assembly 12 includes first and second steering column members 14, 16 engaged with respect to one another for telescoping movement. The first steering column member includes a steering wheel supporting end 26 and the second steering column member 16 includes a pivoting end 28 spaced from the steering wheel supporting end 26. The steering wheel supporting end 26 is pivotable about the pivoting end 28. A bracket 46 extends from the first member 14 to cooperate with the connecting device 18.

The first steering column member 14 is pivotable relative to the connecting device 18 about the pivoting end 28. The connecting device 18 can prevent both telescoping movement and pivoting movement of the first steering column member 14. When in the locked configuration, the connecting device 18 is immovably associated with the first steering column member 14 in response to a separating force up to a first predetermined level of force. If the force exceeds the first predetermined level, the connecting device 18 and the first steering column member 14 slide relative to one another. In other words, during an impact situation, the connecting device 18 and the first steering column member 14 will be fixed with respect to one another unless a force acting on the steering column assembly 12 is greater than the first predetermined level of force. In response to a separating force greater than the first predetermined level, the first locking member 30 slides relative to the bracket 46.

The connecting device 18 includes a first locking member 30 that is slidably associated with the steering column assembly 12. The first locking member 30 is disposed between first and second surfaces 34, 36 defined by the bracket 46 of the first steering column member 14. The connecting device 18 also includes a second locking member 32 that is movable between a locked position and an unlocked position. The exemplary embodiment of the invention includes a pair of second locking members 32, 32a disposed on opposite sides the first locking member 30. When in the locked position, the second locking member 32 contacts the first locking member 30 and the members 30, 32 are immovably associated with one another. When in the unlocked position, the second locking member 32 is spaced from the first locking member 30.

The first locking member 30 includes a first locking portion 38 and the second locking member 32 includes a second locking portion 40. The first locking portion 38 of the first exemplary embodiment of the invention defines a plurality of teeth 58. The second locking portion 40 defines a plurality of teeth 56. The first and second locking portions 38, 40 are selectively engageable with one another to prevent telescoping movement between the first and second members 14, 16. For example, when the second locking member is in the locked position, the first locking portion 38 and the second locking portion 40 are interlocked and immovable associated with one another. The teeth 56 and 58 engage one another when the second locking member 32 is in a locked position. When the second locking member 32 is in the unlocked position, the locking portion 38 and the locking portion 40 are spaced from one another. In other words, The teeth 56, 58 are spaced from one another when the second locking member 32 is in the unlocked position. The cooperation between the first locking portion 38 and the second locking portion 40 prevents telescoping movement between the first and second steering column members 14, 16 up to the first predetermined level of force. During movement of the second locking member 32 between the locked and unlocked positions, the teeth 56 move at least partially perpendicular with respect to the teeth 58.

The connecting device 18 also includes a third locking member 42 releasably attachable to the vehicle and spaced from the first locking member 30. In one embodiment of the invention, the third locking member 42 can be a rake bracket and the second locking member 32 can be attached to a rake bolt. The first and third locking members 30, 42, are movably associated with respect to one another in response to the second locking member 32 being moved to the unlocked position. For example, when the second locking member 32 is in the unlocked position, the first and third locking members 30, 42 can move relative to one another. When the second locking member 32 is in the locked position, the first and third locking members 30, 42 are immovably associated with one another. The bracket 46 is disposed between the first and third locking members 30, 42.

The third locking member 42 includes a third locking portion 44 for cooperating with the second locking member 32 to immovably associate the second and third locking members 32, 42 with respect to one another. The third locking portion 44 defines a plurality of teeth 54. The second locking member 30 defines a plurality of teeth 52 that engage the teeth 54 when the second locking member 32 is in the locked position. The engagement between the teeth 52 and 54 occurs concurrently with the engagement of the teeth 56 and 58. The cooperation between the teeth 56, 58 prevent telescoping movement of the steering column assembly 12 and the engagement of the teeth 52, 54 prevents tilting movement of the steering column assembly 12.

The bracket 46 defines a first slot 48 and the third locking member 42 defines a second slot 50. The second locking member 32 extends through both the first and second slots 48, 50. The second locking member 32 is disposed in both the first and second slots 48, 50 during movement between the locked and unlocked positions.

In an apparatus 10 according to the first embodiment of the invention, a lever 70 engages the second locking member 32. In operation, a driver of the vehicle can rotate the lever 70 along an arcuate path of movement 72 to move the second locking member 32 from the locked position to the unlocked position. When the second locking member 32 is moved to the unlocked position, the driver can adjust the position of the steering wheel in the vehicle telescopically and tiltably. After the steering wheel has been moved to a desired position, the lever 70 can be rotated back along the path of movement 72 to move the second locking member 32 to the locked position. The apparatus 10 includes a biasing device 60 that urges the second locking member 32 to the locked position.

The first energy absorber 20 includes a first anvil 22 that is fixedly associated with either the connecting device 18 or the first steering column member 14. The first energy absorber 20 also includes a first strap 24 that is fixedly associated with the other of the connecting device 18 and the first steering column member 14. In the first exemplary embodiment of the invention shown in FIGS. 1 and 2, the strap 24 is fixedly associated with the bracket 46 of the first steering column member 14 and the anvil 22 is fixedly associated with the first locking member 30. In the second alternative embodiment of the invention, shown in FIG. 3, the strap 124 is fixedly associated with the first locking member 130 and the anvil 122 is fixedly associated with the bracket 146. The strap 24 is drawable over the first anvil 22 to dissipate energy associated with movement of the steering column assembly 12 relative to the connecting device 18. During movement of the steering column assembly 12 relative to the connecting device 18, the first locking member 30 slides relative to the bracket 46.

The apparatus also includes a second energy absorber 64. The second energy absorber 64 dissipates energy in response to relative movement between the connecting device 18 and the vehicle. As set forth more fully below, the connecting device 18 can move relative to the vehicle. The second energy absorber 64 includes an anvil 66 and a strap 68. One of the anvil 66 and strap 68 is fixedly associated with the connecting device 18. The other of the anvil 66 and strap 68 is fixedly associated with the vehicle. In the first exemplary embodiment of the invention, the anvil 66 is supported by the third locking member 42 of the connecting device 18 and the strap 68 is fixedly associated with the vehicle.

The apparatus also includes a third energy absorber 74 disposed in parallel to the second energy absorber 64. The third energy absorber 74 dissipates energy in response to relative movement between the connecting device 18 and the vehicle. The third energy absorber 74 includes at least one capsule 62 releaseably associated with the connecting device 18. For example, the capsule 62 is releasably associated with the third locking member 42 of the connecting device 18. The third energy absorber 74 is movably associated with the connecting device 18 in response to a separating force up to a second predetermined level. The third energy absorber 74 separates from the connecting device 18 in response to a separating force greater than the second predetermined level of force.

In operation, a separating force is generated when the driver of the vehicle impacts the steering column assembly 12 during a crash. If the generating force is not greater than the second predetermined level of force, the steering column assembly 12 will remain fixed with respect to the vehicle. If the separating force is greater than the second predetermined level of force, the third locking member 42 and the capsule 62 will separate and the connecting device 18 and steering column assembly 12 will concurrently move along a first translating collapse path.

During movement of the connecting device 18 and the steering column assembly 12 along the first translating collapse path, separation between the capsule 62 and the third locking member 42 dissipates energy. Also, the strap 68 of the second energy absorber 64 is drawn over the anvil 66 and additional energy is dissipated.

During movement along the first translating collapse path, the connecting device 18 can engage another structure in the vehicle such as a crossbeam and cease to move. After the connecting device 18 ceases to move, the connecting device 18 and the steering column assembly 12 can separate from one another in response to a separating force greater than the first predetermined level of force. The steering assembly column 12 will move along a second translating collapse path after separation from the connecting device 18. During movement of the steering column assembly 12 along the second translating collapse path, the first locking member 30, the second locking member 32 and the third locking member 44 are fixed relative to one another and the first locking member 30 slides with respect to the bracket 46. In response, the strap 24 is drawn over the anvil 22 to dissipate energy.

In the first exemplary embodiment of the invention, the first and second translating collapse paths are disposed in series. As a result, the length over which a deformable member such as the straps 24, 68 can be drawn, is increased. In another aspect of the invention, the movement of the steering column assembly 12 along either of the first or second translating collapse paths can correspond to telescoping movement of the first and second steering column members 14, 16 relative to one another. In other words, the first steering column member 14 could be telescopically collapsing relative to the second steering column member 16 during movement of the steering column assembly 12 along one of or both of the first and second translating collapse paths. Alternatively, movement of the steering column assembly 12 along both of the first and second collapse paths can be translating movement in which the first and second steering column members 14, 16 are fixed relative to one another.

As set forth above, the capsule 62 and the third locking member 42 separate in response to a separating force greater than the second predetermined level of force. Also, the connecting device 18 and the first steering column member 14 separate in response to a separating force greater than the first predetermined level of force. In an exemplary embodiment of the invention, the first predetermined level of force is greater than the second predetermined level of force. In other words, in response to an impact between the driver of the vehicle and the steering column assembly 12, the capsule 62 and third locking member 42 separate before the connecting device 18 separates from the steering column assembly 12. However, in alternative embodiments of the invention, the first predetermined level of force could be less than the second predetermined level of force. In other words, in response to an impact between the driver of the vehicle and the steering column assembly 12, the capsule 62 and third locking member 42 separate after the connecting device 18 separates from the steering column assembly 12.

Figure 3:
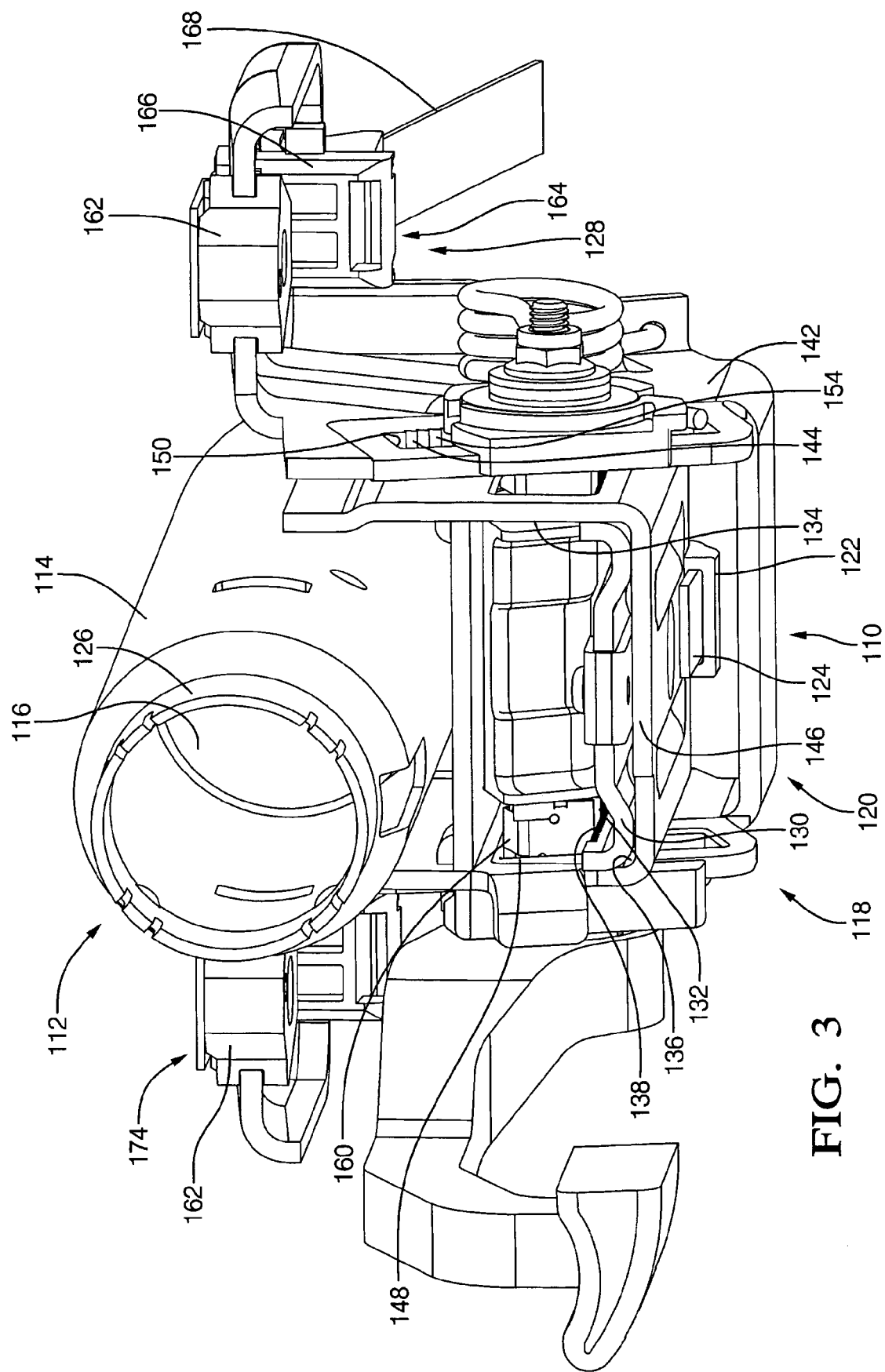
FIG. 3 is a perspective view of a second exemplary embodiment of the invention.

Referring now to FIG. 3, in a second exemplary embodiment of the invention, an apparatus 110 includes a steering column assembly 112 having first and second steering column members 114, 116. A connecting device 118 releasably connects the steering column assembly 112 to the vehicle. A first energy absorber 120 is disposed between the connecting device 118 and the steering column assembly 112. The first energy absorber 120 includes the first anvil 122 and the first strap 124. The steering column assembly 112 includes a steering wheel supporting end 126 and a pivoting end 128.

The connecting device 118 includes a first locking member 130, a second locking member 132, and a third locking member 142. The first locking member 130 is disposed between first and second surfaces 134, 136 of a bracket 146. The first locking member 130 defines a first locking portion 138. The third locking member 142 includes a third locking portion 144 defining a plurality of teeth 154. A bracket 146 associated with the first steering column member 114 defines a first slot 148 and the third locking member 142 defines a second slot 150. A biasing device 160 biases the second locking member 132 to the locked position.

A third energy absorber 174 includes a capsule 162 disposed between the third locking member 142 and the vehicle. A second energy absorber 164 is disposed in parallel to the third energy absorber 174 and includes a second anvil 166 and a second strap 168.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
a steering column assembly having a pivot end and positionable in a vehicle, the steering column assembly having first and second steering column members engaged with respect to one another for telescoping movement;
a connecting device having a lever and being releaseably attachable to the vehicle and moveable between locked and unlocked configurations to selectively lock said steering column assembly with respect to the vehicle and the first steering column member with respect to the second steering column member;
a bracket extending from the first steering column member and defining a first slot having a plurality of teeth;
a first locking member releasably attachable to the vehicle, the first locking member defining a second slot having a plurality of teeth, the connecting device further having a second locking member coupled to the lever and extending through the first and second slots, the second locking member having a first plurality of teeth positioned to engage the plurality of teeth on the first slot of the bracket when the connecting device is in the locked position, the second locking member having a second plurality of teeth positioned to engage the plurality of teeth on the second slot of the first locking member when the connecting device is in the locked position; and
a first energy absorber disposed between said connecting device and said steering column assembly and engaged to dissipate energy in response to relative movement between said connecting device and said steering column assembly when said connecting device is in said locked configuration.

2. An apparatus comprising:
a steering column assembly positionable in a vehicle;
a connecting device releaseably attachable to the vehicle and moveable between locked and unlocked configurations to selectively lock said steering column assembly with respect to the vehicle;
a first energy absorber disposed between said connecting device and said steering column assembly and engaged to dissipate energy in response to relative movement between said connecting device and said steering column assembly when said connecting device is in said locked configuration and disengaged to dissipate energy in response to relative movement between said connecting device and said steering column when said connecting device is in said unlocked configuration; and a second energy absorber associated with said connecting device to dissipate energy in response to movement of said connecting device with respect to the vehicle.

3. The apparatus of claim 2 wherein the first energy absorber is further defined as being disengaged to dissipate energy in response to relative movement between said connecting device and said steering column when said connecting device is in said unlocked configuration.

4. The apparatus of claim 2 wherein said steering column assembly includes first and second steering column members engaged with one another for telescoping movement.

5. The apparatus of claim 4 wherein said first energy absorber includes a first anvil fixedly associated with one of said connecting device and said first steering column member and a first strap drawable over said first anvil and fixedly associated with the other of said connecting device and said first steering column member.

6. The apparatus of claim 4 wherein said first steering column member is further defined as having a steering wheel supporting end and said second steering column member is further defined as having a pivoting end (28, 128) spaced from said steering wheel supporting end.

7. The apparatus of claim 4 wherein said first steering column member is pivotable relative to said connecting device.

8. The apparatus of claim 7 wherein said connecting device prevents both said telescoping movement and pivoting movement of said first steering column member.

9. The apparatus of claim 4 wherein said connecting device is immovably associated with said first steering column member in response to a separating force up to a first predetermined level of force when in said locked configuration and is slidable relative to said first steering column member in response to separating force greater than the first predetermined level of force when said in said locked configuration.

10. The apparatus of claim 2 wherein said connecting device further comprises:

a first locking member slidably associated with said steering column assembly; and a second locking member moveable between a locked position contacting said first locking member and an unlocked position spaced from said first locking member.

11. The apparatus of claim 10 wherein said first locking member is pressed between first and second surfaces defined by said first steering column member.

12. The apparatus of claim 10 wherein said first locking member is immovably associated with said steering column assembly in response to a separating force up to a first predetermined level of force when said second locking member is said locked position and is slidable with respect to said steering column assembly in response to a separating force greater than the first predetermined level of force when second locking member is said locked position.

13. The apparatus of claim 10 wherein said first locking member includes a first locking portion and said second locking member includes a second locking portion selectively engageable with said first locking portion to prevent and said telescoping movement.

14. The apparatus of claim 10 wherein said connecting device further comprises:

a third locking member releaseably attachable to a vehicle and slidably engaged with said first locking member.

15. The apparatus of claim 14 wherein said first and third locking members are immovably associated with one another in response to said second locking member being moved to said locked position.

16. The apparatus of claim 14 wherein said steering column assembly includes a bracket disposed between said first and third locking members.

17. The apparatus of claim 16 wherein said bracket includes first and second surfaces and said first locking member is further defined as being pressed between first and second surfaces.

18. The apparatus of claim 14 wherein said first locking member includes a first locking portion and said second locking member includes a second locking portion and said third locking member includes a third locking portion, wherein said second locking portion being moveable between an unlocked position spaced from said first and third locking portions and a locked position contacting said second and third locking portions.

19. The apparatus of claim 18 wherein cooperation between said first locking portion and said second locking portion prevents said telescoping movement and cooperation between said third locking portion and said second locking portion prevents tilting movement.

20. The apparatus of claim 19 wherein said bracket defines a first slot and said third locking member defines a second slot and said second locking member extends through said first and second slots.

21. The apparatus of claim 20 wherein said second locking portion defines a first plurality of teeth and said third locking member defines a second plurality of teeth extending along said second slot, wherein said first and second pluralities of teeth engage one another when said second locking member is in said locked position and wherein said first and second pluralities of teeth are spaced from one another when said second locking member is in said unlocked position.

22. The apparatus of claim 21 wherein said second locking member moves at least partially perpendicular with respect to said second slot during movement between said locked and unlocked positions.

23. The apparatus of claim 22 wherein said second locking member defines a third plurality of teeth and said first locking member defines a fourth plurality of teeth disposed adjacent to said first slot, wherein said third and fourth pluralities of teeth engage one another when said second locking member is in said locked position and are spaced from one another when said second locking member is in said unlocked position.

24. The apparatus of claim 23 wherein said second locking member moves at least partially perpendicular with respect to said fourth plurality of teeth during movement between said locked and unlocked positions.

25. The apparatus of claim 10 including a biasing device urging said second locking member to said locked position.

26. The apparatus of claim 2 further comprising: at least one capsule releaseably associated with said connecting device to releaseably attach said first connecting device to a vehicle.

27. The apparatus of claim 2 further comprising:

a third energy absorber disposed in parallel to said second energy absorber to dissipate energy in response to movement of said connecting device with respect to the vehicle.

28. The apparatus of claim 27 wherein said first energy absorber includes first anvil fixedly associated with one of said steering column assembly and said connecting device and a first strap drawable over said first anvil and fixedly associated with the other of said steering column assembly and said connecting device and wherein said second energy absorber includes a second anvil fixedly associated with one of said connecting device and said third energy absorber and a second strap drawable over said second anvil and fixedly associated with the other of said connecting device and said third energy absorber.

29. The apparatus of claim 28 wherein said third energy absorber is further defined as being immovably associated with said connecting device in response to a separating force up to a second predetermined level of force and as being separable from said connecting device in response to a separating force greater than the second predetermined level of force.

30. The apparatus of claim 29 wherein said connecting device is immovably associated with said steering column assembly in response to a separating force up to a first predetermined level of force and as being slidably associated with said steering column assembly in response to a separating force greater than the first predetermined level of force, wherein said first predetermined level of force is greater than said second predetermined level of force.

* * * * *